US012221249B2

(12) United States Patent
Alrebh et al.

(10) Patent No.: US 12,221,249 B2
(45) Date of Patent: Feb. 11, 2025

(54) GAS CYLINDER LIFTING EXTENSION

(71) Applicant: SAUDI ARABIAN OIL COMPANY, Dhahran (SA)

(72) Inventors: Mohammed Y. Alrebh, Al Iskan (SA); Hussain I. Hussain, Al Nassrah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 48 days.

(21) Appl. No.: 18/181,894

(22) Filed: Mar. 10, 2023

(65) Prior Publication Data

US 2024/0300693 A1 Sep. 12, 2024

(51) Int. Cl.
*B65D 19/00* (2006.01)
*F17C 13/08* (2006.01)

(52) U.S. Cl.
CPC ........ *B65D 19/0012* (2013.01); *F17C 13/084* (2013.01); *B65D 2519/00268* (2013.01); *B65D 2519/00771* (2013.01); *F17C 2201/0104* (2013.01); *F17C 2201/032* (2013.01); *F17C 2205/0103* (2013.01)

(58) Field of Classification Search
CPC .... B65D 19/00; B65D 19/0012; B65D 55/00; B65D 2519/00268; B65D 2519/00771; B65G 7/12; F17C 13/084; F17C 2201/0104; F17C 2201/032; F17C 2205/0103
USPC ............... 220/752–764; 294/15, 30, 31.2, 32
See application file for complete search history.

(56) References Cited

U.S. PATENT DOCUMENTS 1,639,786 A * 8/1927 Steinmetz ................. B66C 1/14 220/760
3,776,412 A * 12/1973 Mink ...................... F17C 13/06 220/726
3,921,872 A * 11/1975 Buell, Jr. .................. A45F 5/00 294/31.2
4,332,331 A * 6/1982 Fawley ................. F17C 13/002 220/726
4,463,978 A * 8/1984 Mountain ............. F17C 13/084 294/31.2
4,560,193 A * 12/1985 Beebe ................... F17C 13/084 294/31.2
4,624,495 A * 11/1986 Marsh ...................... B65G 7/00 294/31.2

FOREIGN PATENT DOCUMENTS

CN 202944975 U 5/2013
CN 203876785 U 10/2014
CN 211338700 U 8/2020

* cited by examiner

*Primary Examiner* — Bryon P Gehman
(74) *Attorney, Agent, or Firm* — Osha Bergman Watanabe & Burton LLP

(57) ABSTRACT

A gas cylinder lifting extension for industrial gas cylinder transportation. The gas cylinder lifting extension containing a first end with a cylindrical cavity and a second flat end with two perpendicular, rectangular channels through it to allow for secured lifting with a forklift.

14 Claims, 4 Drawing Sheets

GAS CYLINDER LIFTING EXTENSION

BACKGROUND

Most industrial facilities store and handle compressed gas cylinders in daily operations. Typical full compressed cylinders can weigh between 200-315 pounds, which are moved around the facility routinely. Compressed gas cylinders are generally stored in a central location and moved to other locations as needed.

SUMMARY

In one aspect, embodiments disclosed herein relate to a gas cylinder lifting extension that allows gas cylinders to be transported via forklift. The extension acts as an adapter. The extension containing a cavity that the gas cylinder rests into. The opposite side of the extension is flat and contains a rectangular channel for the forklift tine to use as a secured means to lift the gas cylinder with the extension on it Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Due to the size and weight of conventional compressed gas cylinders, moving the cylinders can result in safety hazards for personnel manually transferring the cylinders to trolleys and other conventional cylinder transportation devices. This manual process results in both physical injuries and a higher risk of unintended impact to the cylinder if the cylinder is dropped. In addition to the occupational hazards presented by existing processes, current methods are inefficient and resource intensive. Accordingly, embodiments disclosed herein are related to an apparatus for improving ease of transport of compressed gas cylinders.

In one aspect, embodiments disclosed herein relate to an apparatus for attaching to a compressed gas cylinder to allow mobilization of one or more compressed gas cylinders with a forklift.

A compressed gas cylinder consists of a cylindrical body where the gas is stored, a valve, and a valve cap. The valve sits on the top of the cylindrical body and is covered by the valve cap. Typical industrial compressed gas cylinders 13 range from 20 cubic feet and 5.25" in diameter to 330 cubic feet and 9.25" in diameter. The weight of a compressed gas cylinder can vary based on the gas stored in the cylinder, but often weigh between 200-315 pounds when full. These compressed gas cylinders move frequently during industrial operations and are often manually carried from a storage location to a trolley or other transportation device. The trolley with the compressed gas cylinder is then moved to a new location and the compressed gas cylinder is manually unloaded from the trolley. Due to the weight and long, cylindrical shape, this material handling step poses an occupational safety hazard and is inefficient as each cylinder must be moved individually.

Figure 1:
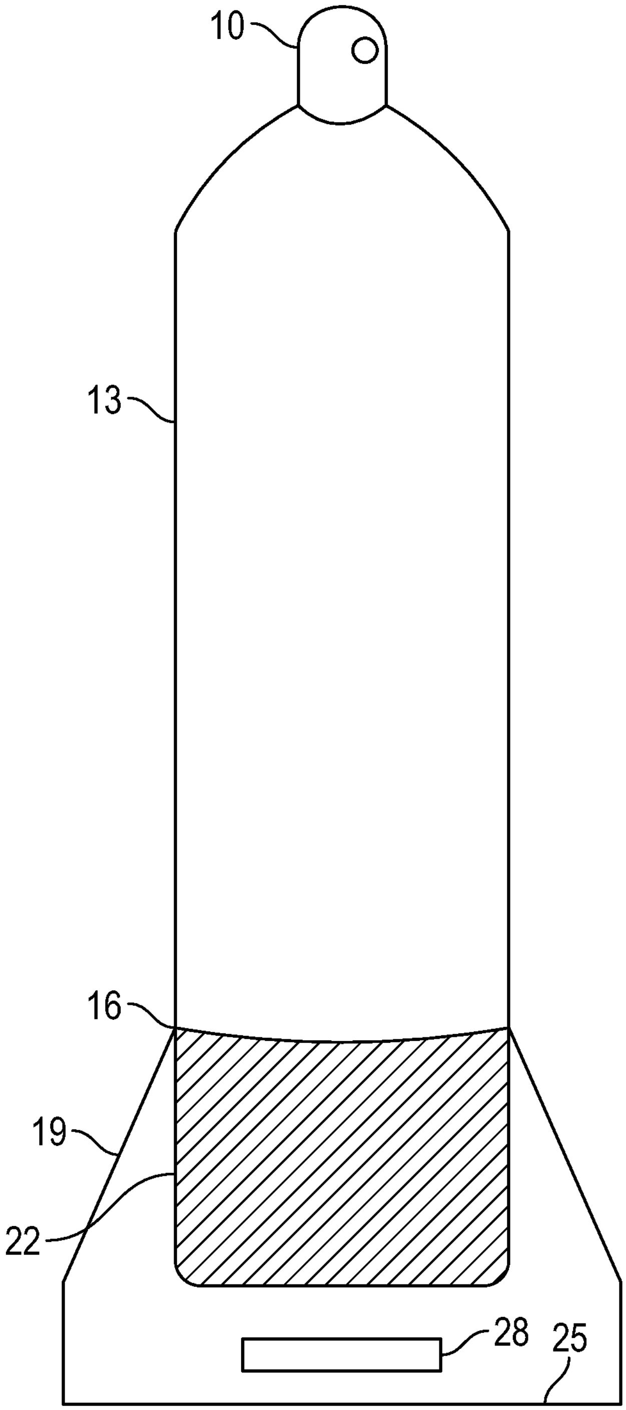
FIG. 1 is an illustration of a compressed gas cylinder with a lifting extension attached according to embodiments of the present disclosure.
Figure 2:
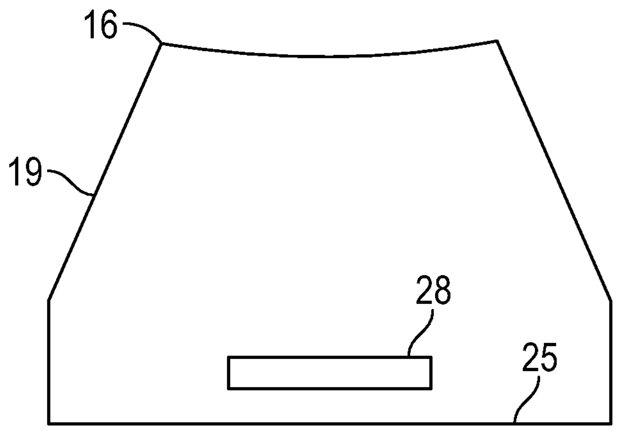
FIG. 2 is an illustration of a side view of the lifting extension according to embodiments of the present disclosure.

Referring now to FIG. 1, a compressed gas cylinder 13 with an adapter 19 is illustrated. FIG. 2 illustrates the same adapter 19 without a compressed gas cylinder. A conventional compressed gas cylinder 13 consists of a cylindrical body where the gas is stored, a valve, and a valve cap 10. The valve sits on the top of the cylindrical body and is covered by the valve cap 10. The adapter 19 is configured to receive the compressed gas cylinder 13 which rests securely in the adapter 19. In order for the compressed gas cylinder 13 to be secure in the adapter 19, the adapter 19 has a cavity 22 with an inner diameter slightly larger than that of an outer diameter of the compressed gas cylinder 13. This arrangement allows the cylinder to fit fully into the cavity with enough friction to provide stability to the compressed gas cylinder. This top end 16 of the adapter 19 is tapered around the compressed gas cylinder 13, to provide additional rigidity and support for the compressed gas cylinder 13 while in motion. In some embodiments, the cavity 22 may have an inner diameter of between $1/64^{th}$ inch to $1/16^{th}$ inch greater than the outer diameter of the compressed gas cylinder 13.

On the end of the adapter 19 opposite the top end (first end) 16 is a flat, square surface, or flat end (second end) 25, which provides stability to the standing compressed gas cylinder 13. This flat end 25 is weighted to further promote stability. In some embodiments, the adapter may have a weight of from 45 lbs to 71 lbs, with a majority of the weight concentrated near the flat end 25. Those skill in the art will appreciate that while the adapter is shown as having a square shape, any stable shape suitable for providing an opening or gap on all sides for the gas cylinder to be forklifted is envisioned without departing from the scope disclosed herein.

The flat end 25 includes a first rectangular channel 28 spanning from a first side of the square shape of the adapter 19 to a second, opposite parallel side. This rectangular channel 28 provides a path for a forklift tine to pick up the adapter 19 with a loaded compressed gas cylinder 13. The flat end 25 may also include a second channel crossing the first rectangular channel 28 perpendicularly to allow a forklift to pick up the compressed gas cylinder from all sides. The forklift can carry one or more gas cylinders at one time on each forklift tine depending on the size of the gas cylinder and the tine length. Because of this functionality, the compressed gas cylinders will be easy to pick up and move directly from a filled cage storage area 40.

Figure 3:
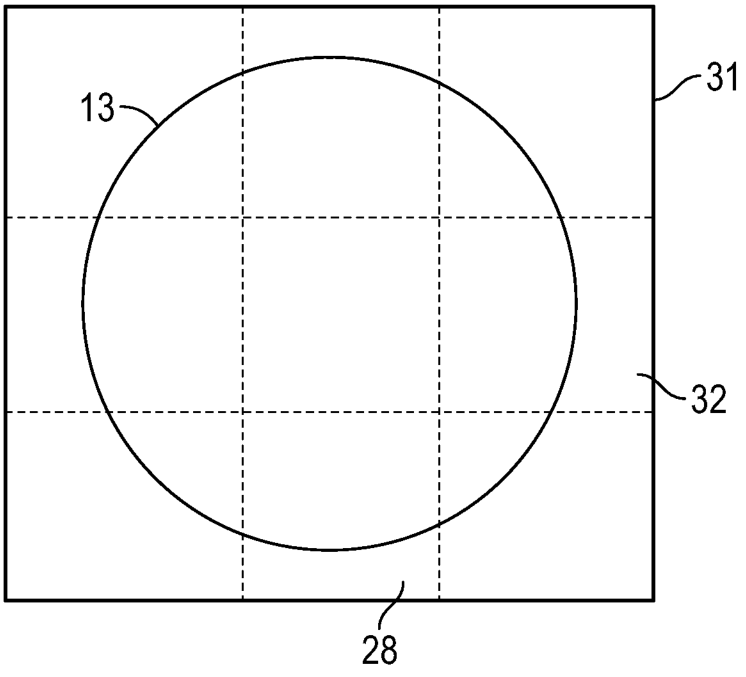
FIG. 3 is an illustration of a top view of the lifting extension according to embodiments of the present disclosure.

Referring now to FIG. 3, a top down view of the adapter 19 is illustrated. The compressed gas cylinder 13 rests in the adapter 19. The four identical flat sides 31 of the second end of the adapter provide stability for the compressed gas cylinder. The first rectangular channel 28 is shown spanning from the first side across to the second, parallel side. A second rectangular channel 32 crosses the first rectangular channel 28 perpendicularly, spanning from the third side across to the fourth, parallel side.

Figure 4:
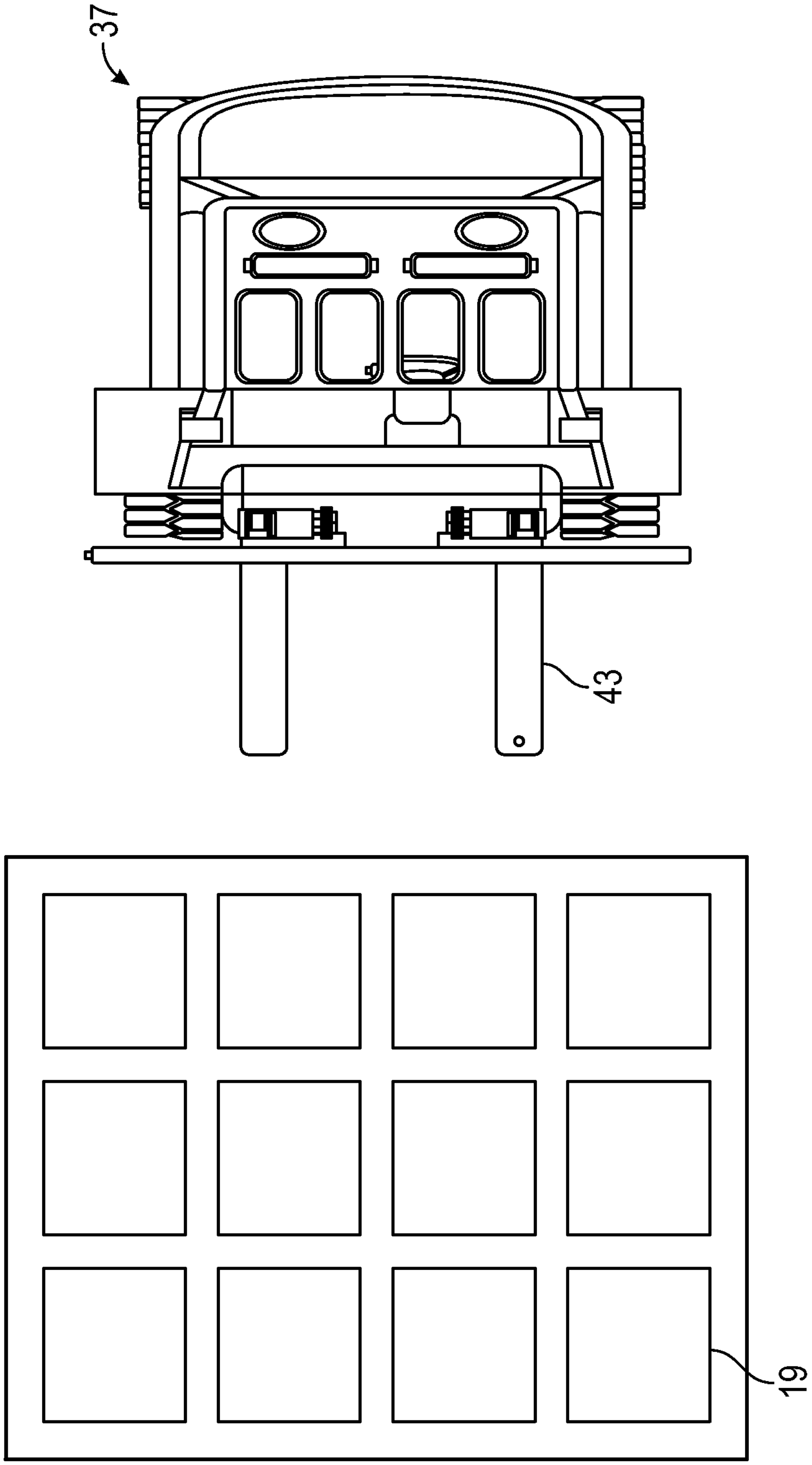
FIG. 4 is an illustration of a top view of a plurality of lifting extensions attached to gas cylinders stored and accessed by the forklift according to embodiments of the present disclosure.

Referring now to FIG. 4, a plurality of adapters 19 are illustrated as arranged in a skid 40 for transport using a forklift 37. While some embodiments disclosed herein are related to embodiments where a single compressed gas cylinder with adapter 19 is moved using a forklift, other embodiments disclosed are related to transporting multiple compressed gas cylinders 19 using the skid 40, such as shown in FIG. 4. The empty gas cylinders are loaded into the adapters prior to normal operations. The size of the rectangular channels 28, 32 should be 0.5 of an inch to 0.75 of an inch greater in height and 0.5 of an inch to 0.75 of an inch greater in width than the tine 43 of a forklift 37. The depth of the forklift tine 43 will indicate how many compressed gas cylinders 13 with attached adapters 19 can be transported at any given time.

The adapter 19 is constructed out of steel, iron, or aluminum and may contain an industrial-level glue in the cavity to provide rigidity and stability to the cylinder. The adapter may contain a weighted material within it, such as cement or sand filler to further provide stability.

Figure 5:
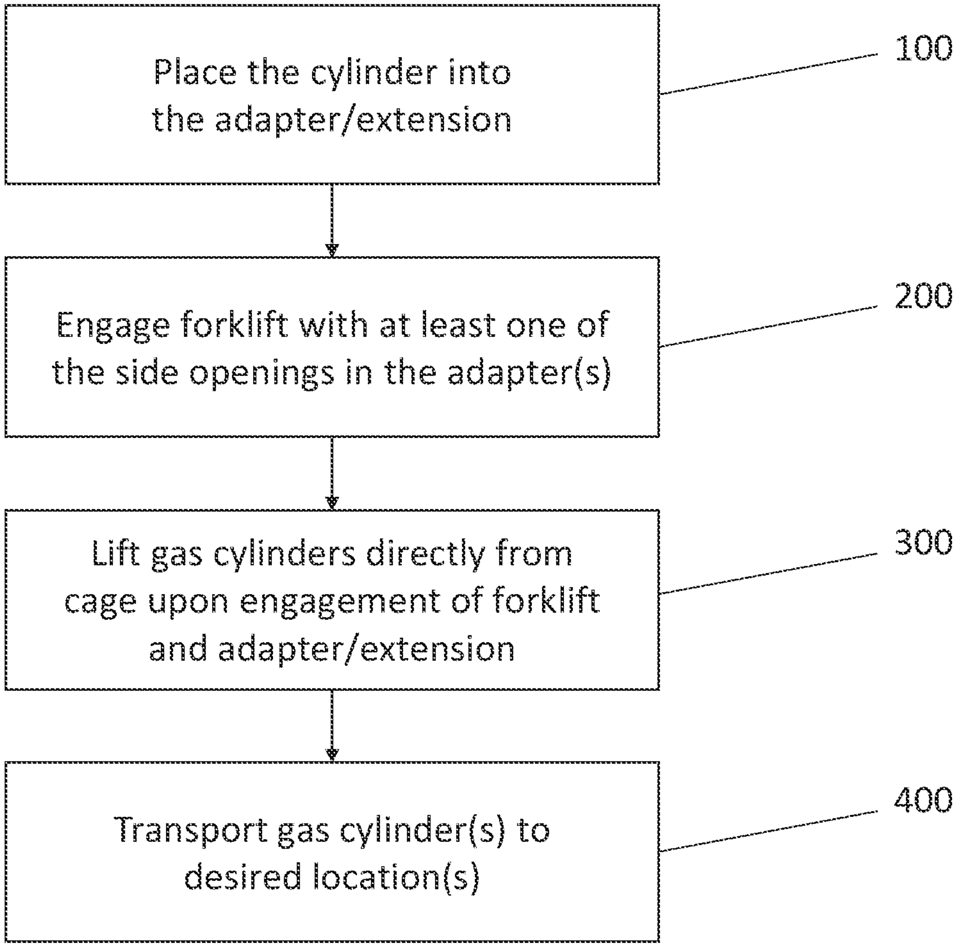
FIG. 5 is a flow chart of the use of the adapter according to embodiments of the present disclosure.

FIG. 5 shows a flow chart of the method of use of the adapter. According to the method, step 100 includes placing a compressed gas cylinder in an adapter as described in one or more embodiments herein. Step 200 includes the forklift engaging with at least one of the side openings in the adapter(s) with the gas cylinder secured in the adapter. Step 300 includes lifting the gas cylinder from the cage once the forklift tines are engaged in the rectangular channels of the adapter(s). Step 400 includes the forklift carrying the gas cylinder(s) to the desired location(s). Compressed gas cylinders may be initially loaded into the adapter as described in one or more embodiments disclosed herein by manually placing the empty cylinder into the adapter for permanent use.

Embodiments of the present disclosure may provide at least one of the following advantages. This adapter will allow personnel to move compressed gas cylinders without manual lifting, preventing physical injuries, and streamlining this industrial process. The adapter will allow multiple compressed gas cylinders to be moved at one time, further streamlining the process. In addition, this extension will allow lifting the gas cylinder from four directions as there will be an opening in each side. Compressed gas cylinders are often supplied to support production-related functions in an industrial setting, such as welding or laser-cutting metals. By streamlining this support function, overall industrial processes may improve throughput and efficiency, and thus reduce operating costs while minimizing occupational risks.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A gas cylinder lifting extension, comprising:

an adapter, comprising;

a first end that has a cylindrical cavity with an inner diameter greater than or equal to an outer diameter of a compressed gas cylinder and configured to secure around the compressed gas cylinder;

a second end opposite to the first end, the second end including a flat surface and a first rectangular channel extending through the adapter from a first side to a second side;

wherein the second end is weighted.

2. The gas cylinder lifting extension of claim 1, wherein the first end is a circular shape.

3. The gas cylinder lifting extension of claim 1, wherein the second end is a square shape.

4. The gas cylinder lifting extension of claim 1, wherein the first rectangular channel extends completely through the adapter and has a width 0.5 of an inch to 0.75 of an inch greater than a width of a forklift tine and a height 0.5 of an inch to 0.75 of an inch greater than a height of the forklift tine.

5. The gas cylinder lifting extension of claim 1, further comprising a second rectangular channel extending through the adapter from a third side to a fourth side, wherein the first side and the second side are parallel to each other and perpendicular to the third side and the fourth side.

6. The gas cylinder lifting extension of claim 1, wherein the adapter is made of a material selected from one of steel, iron, and aluminum.

7. The gas cylinder lifting extension of claim 6, wherein the adapter weighs from 45 lbs to 71 lbs.

8. A gas cylinder lifting extension, comprising:

an adapter, comprising:

a first end that has a cylindrical cavity with an inner diameter greater than or equal to an outer diameter of a compressed gas cylinder and configured to secure around the compressed gas cylinder;

a second end opposite to the first end, the second end including a flat surface and a first rectangular channel extending through the adapter from a first side to a second side; and a second rectangular channel extending through the adapter from a third side to a fourth side, wherein the first side and the second side are parallel to each other and perpendicular to the third side and the fourth side.

9. The gas cylinder lifting extension of claim 8, wherein the first end is a circular shape.

10. The gas cylinder lifting extension of claim 8, wherein the second end is a square shape.

11. The gas cylinder lifting extension of claim 10, wherein the second end is weighted.

12. The gas cylinder lifting extension of claim 8, wherein the first rectangular channel extends completely through the adapter and has a width 0.5 of an inch to 0.75 of an inch greater than a width of a forklift tine and a height 0.5 of an inch to 0.75 of an inch greater than a height of the forklift tine.

13. The gas cylinder lifting extension of claim 8, wherein the adapter is made of a material selected from one of steel, iron, and aluminum.

14. The gas cylinder lifting extension of claim 13, wherein the adapter weighs from 45 lbs to 71 lbs.

* * * * *